Sept. 16, 1969     G. R. EAKIN ET AL     3,466,917
METHOD AND APPARATUS FOR FORGING BLANKS
Filed Oct. 19, 1966     4 Sheets-Sheet 1
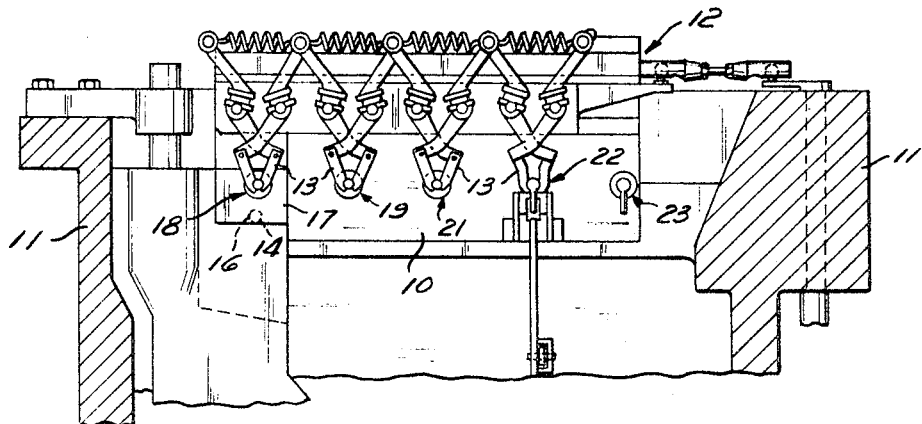
Fig. 1
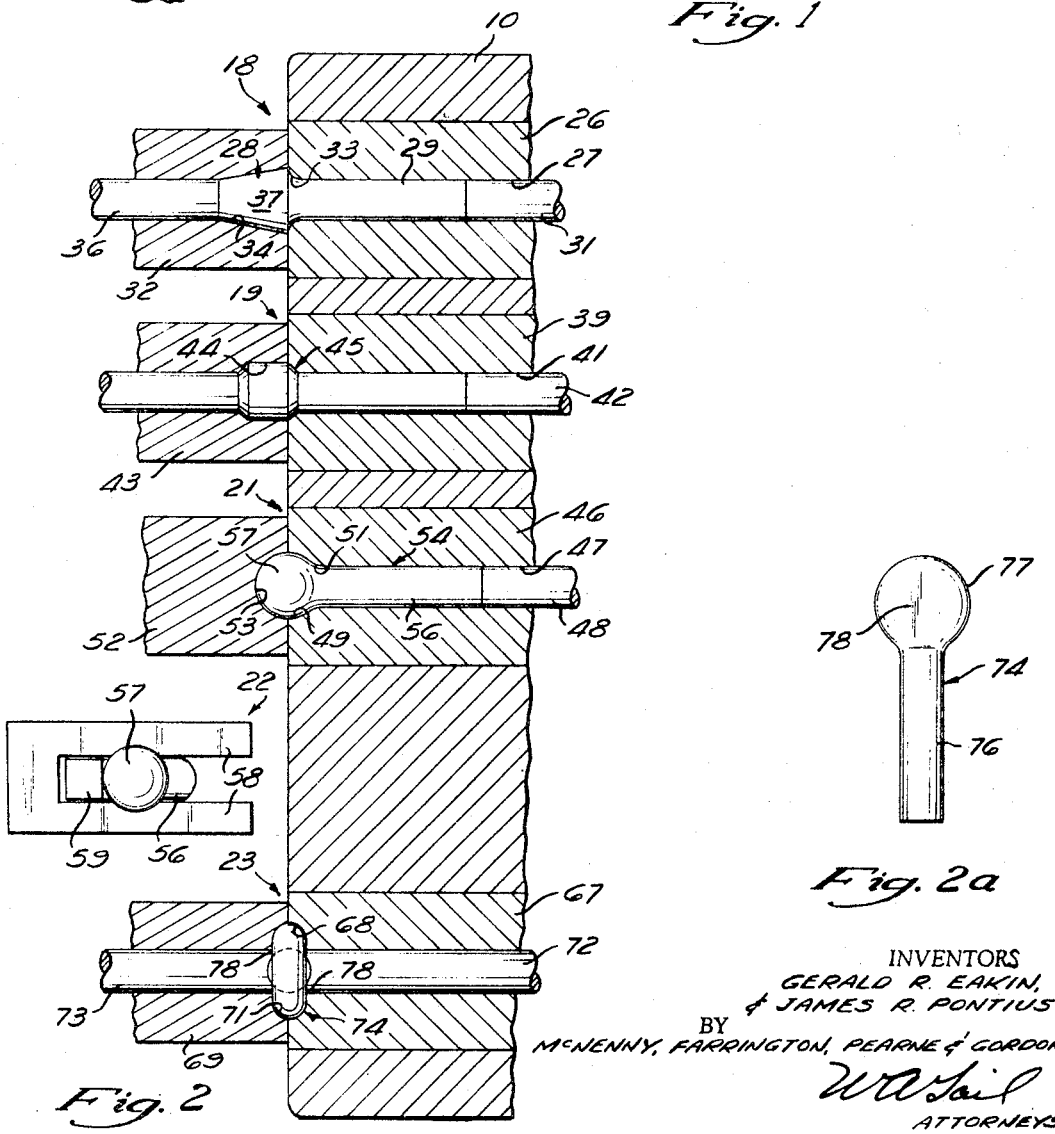
Fig. 2
Fig. 2a
INVENTORS
GERALD R. EAKIN,
& JAMES R. PONTIUS
BY McNENNY, FARRINGTON, PEARNE & GORDON
ATTORNEYS

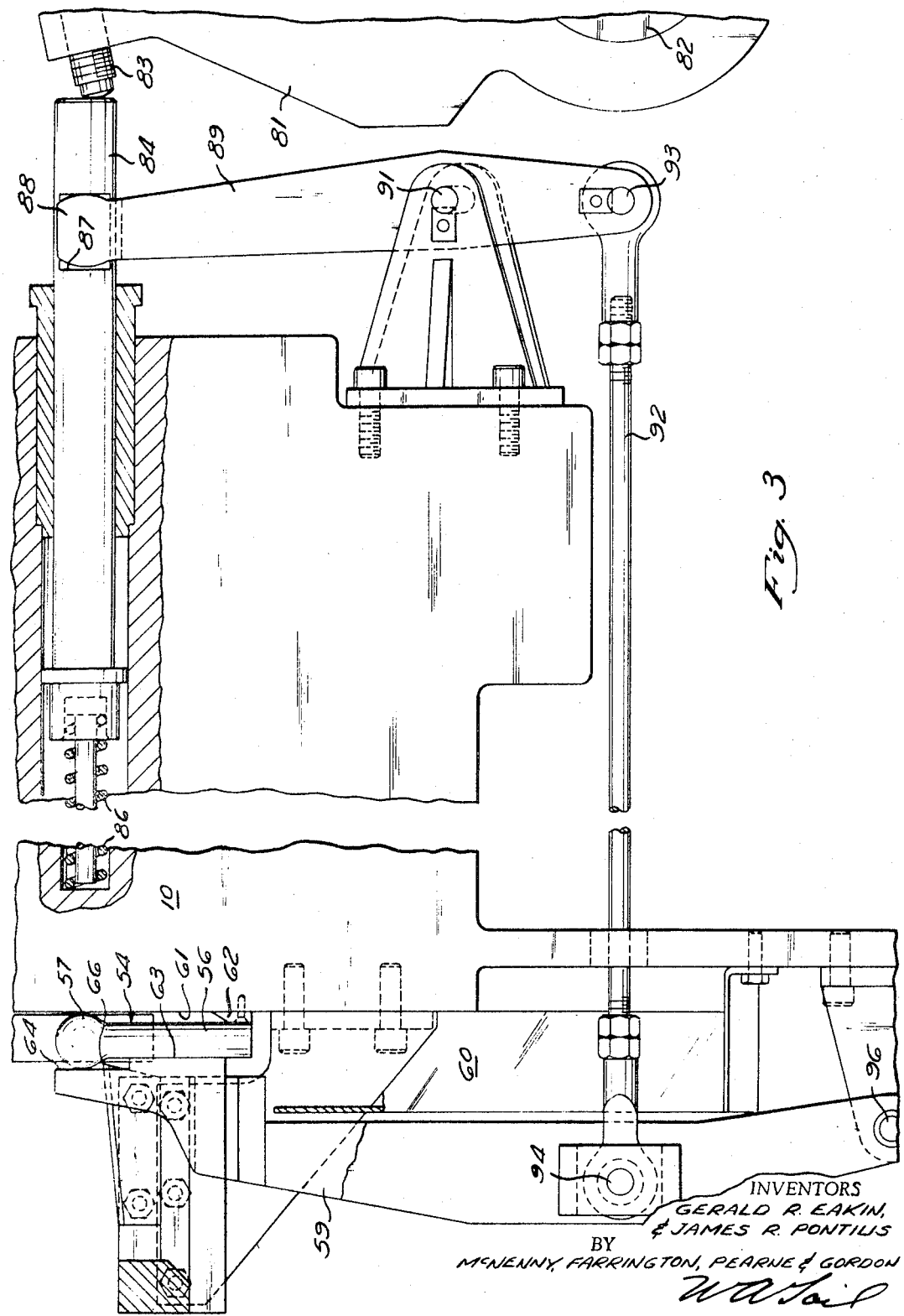

Sept. 16, 1969     G. R. EAKIN ET AL     3,466,917
METHOD AND APPARATUS FOR FORGING BLANKS
Filed Oct. 19, 1966     4 Sheets-Sheet 3

INVENTORS
GERALD R. EAKIN,
& JAMES R. PONTIUS
BY
McNENNY, FARRINGTON, PEARNE & GORDON
ATTORNEYS

INVENTORS
GERALD R. EAKIN,
& JAMES R. PONTIUS
BY
MCNENNY, FARRINGTON, PEARNE, & GORDON

ATTORNEYS

United States Patent Office 3,466,917
Patented Sept. 16, 1969

3,466,917
METHOD AND APPARATUS FOR
FORGING BLANKS
Gerald R. Eakin, Tiffin, Ohio, and James R. Pontius,
Birmingham, Mich., assignors to The National Machinery Company, Tiffin, Ohio, a corporation of Ohio
Filed Oct. 19, 1966, Ser. No. 587,882
Int. Cl. B21j 13/00; B21d 43/04; B21k 1/44
U.S. Cl. 72—354                               25 Claims

ABSTRACT OF THE DISCLOSURE

A forging machine is disclosed for forming eye-bolts and the like. The machine includes a plurality of die stations in which a blank is progressively upset by endwise pressure and a final die station in which the blank is laterally upset. A turning transfer is provided to turn the blank through 90° before it reaches the final die station so that a laterally applied force is applied in the same direction as the previous endwise upsetting forces.

---

This invention relates to forging machines of the general type referred to as progressive formers or headers and relates particularly to such a machine incorporating a novel and improved transfer mechanism adapted to turn an elongated blank from a generally horizontal position to a generally vertical position. This invention also relates to a novel and improved method of forging blanks which is particularly suited to such machines.

In certain types of blanks, such as the blanks for eye bolts, T bolts, banjo couplings, or the like, it is desirable to first subject the blank to endwise pressure to upset an enlarged end portion, and thereafter subject the blank, usually on the enlarged headed portion, to lateral pressure to further shape the blank, usually by flattening the upset portion. Typical progressive formers and headers provide only a single tool carrying slide, so such machines must apply the forming pressure at each forming station in a direction aligned with slide movement. Consequently, in the past it has not been possible to form such blanks in a progressive former or header.

A progressive former incorporating the present invention includes a transfer mechanism which is operable to turn an elongated blank about an axis lateral with respect to the length of the blank through substantially ninety degrees as it is transferred from one die station to the next. Therefore, it is possible with such a machine to perform both endwise upsetting and lateral forming operations in a single machine of this type even though both types of operations are produced by pressure applied in the direction of movement of the slide. Consequently, the machine can be used to form blanks for articles of the general type mentioned above wherein deforming pressures are required in two different directions with respect to the length of the blank.

In the illustrated embodiments of this invention an eye bolt blank is formed by a novel and improved method. One end of a cylindrical blank is progressively upset by endwise pressure to form an intermediate blank having a shank and a spherical upset portion at one end. This intermediate blank is then turned through ninety degrees about a lateral axis during its transfer to a subsequent die station. Thereafter, the upset portion is subjected to laterally imposed deforming forces and the upset portion is flattened to form the required shape for the eye bolt.

Two embodiments of a machine incorporating this invention are illustrated. In one illustrated machine the turning of the blank occurs at a turning station. Located at this station are a pair of stationary rails or support members that are spaced apart a distance arranged to permit the shank to fall between the support members while the blank is supported by its upset end on the support members.

The support members terminate at a location spaced away from the face of the die breast, so that the transfer grippers can move the blank along the die breast face to the subsequent work station. A transfer arm is provided to push the blank, supported by the support members, to a transfer position and to hold the blank against the die breast face while the gripper transfer closes on and grips the blank. The transfer arm is powered by the ejection mechanism provided on such progressive formers to eject blanks from die stations. Because such ejection mechanisms are already timed with the operation of the gripper transfer, the operation of the transfer arm is properly timed. The basic structure of the typical progressive former is not changed to any appreciable extent when incorporating the present invention. Consequently, reliability of machine operation is not impaired and the cost of the machine is minimized.

In the other illustrated machine a holding station is provided in the die breast and the support rails are movable toward and away from the station. In this embodiment movement of the support rails and movement of the blank into the holding station is provided by tooling carried by the header slide.

It is an important object of this invention to provide a novel and improved transfer mechanism for progressive formers or the like which is operable to turn an elongated blank about an axis which is lateral with respect to the length of the blank.

It is another important object of this invention to provide a novel and improved progressive former, or the like, including a transfer mechanism adapted to turn a blank through substantially ninety degrees as the blank is transferred from one die station to the next.

It is another important object of this invention to provide means adapted to turn an elongated blank from a horizontal position to a substantially vertical position as such blank is transferred between work stations of a progressive former or the like.

It is another important object of this invention to provide a progressive header, or the like, including transfer means operable to turn an elongated blank from a horizontal position to a vertical position as the blank is transferred between adjacent die stations and wherein gravity provides the turning force.

It is another important object of this invention to provide a novel and improved method of forming blanks wherein the blank is subjected to a plurality of forming operations in each of which the deforming forces are applied in the same direction and wherein the blank is turned between adjacent forming operations so that the deforming forces are applied in different directions with respect to the blank.

It is another important object of this invention to provide a novel and improved method of forming blanks for eye bolts, or the like, wherein an elongated generally cylindrical blank is subjected to endwise pressure to form an upset at one end thereof, is subsequently turned through substantially ninety degrees, and thereafter deforming forces are laterally applied to the upset portion to flatten such upset portion.

Further objects and advantages will appear from the following description and drawings, wherein:

FIGURE 1 is a cross section of a progressive header incorporating this invention, taken across the machine in front of the die breast and illustrating the general structural arrangement of the gripper transfers and the turning station;

FIGURE 2 is a horizontal section through the die stations illustrating the dies and the progressive operations for forming an eye bolt blank;

FIGURE 2a is a side elevation of a finished eye bolt blank;

FIGURE 3 is an enlarged fragmentary section through the turning station illustrating the structural detail thereof and the linkage for the operation of the transfer arm;

Figure 4:
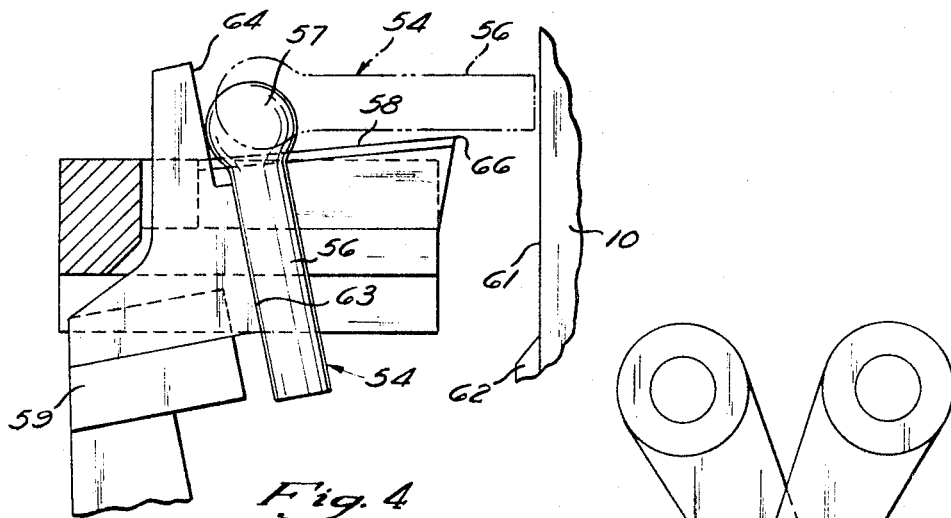
FIGURE 4 is an enlarged fragmentary side elevation of the turning station illustrating the blank in phantom in its horizontal position in which it is delivered to the turning station and illustrating in full line the position of the blank after it swings or turns to the generally vertical position.
Figure 5:
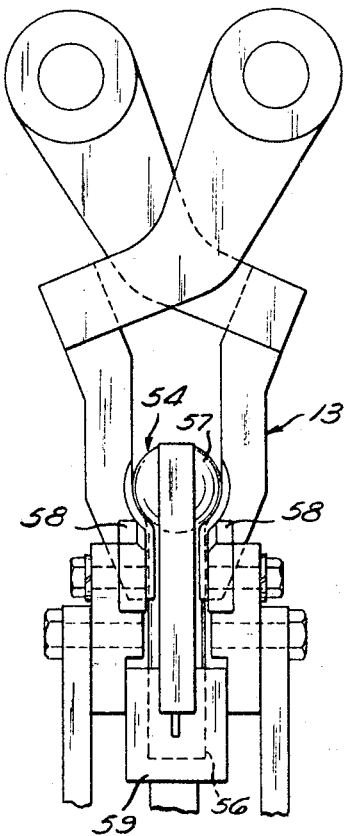
FIGURE 5 is a fragmentary view illustrating the gripping of the turned blank.

Referring to FIGURE 1, a progressive former or header incorporating this invention is illustrated by a cross section taken generally across the face of the die breast. The die breast 10 extends laterally across the machine between the sides of the frame 11. A gripper transfer mechanism 12 is mounted for reciprocating movement about the die breast and is provided with four pairs of gripper fingers 13.

In the illustrated embodiment rod or wire stock 14 is fed into a shear station 16 and is cut to blank length by a vertically movable cutter 17. The cutter 17 transports the blanks to a first die station 18 wherein the first working operation is performed on the blank. In some machines an intermediate transfer location may be provided between the shear station and the first die station. After the blank is worked at the first die station 18 it is ejected from the dies and is gripped by the first pair of grippers 13 and carried to the second die station 19. After the working operation at the second die station 19 the blank is transported by the second pair of grippers 13 to the third die station 21 where it is again worked. In the illustrated embodiment the blank completed at the third die station 21 has a cylindrical shank and a spherical head as will be described in more detail below.

The blank ejected from the third die station 21 is transported by the third pair of grippers 13 to a turning station 22. At this location the blank is turned from its horizontal position to a generally vertical position. The vertically disposed blank is then transported by the last pair of grippers 13 to a final or fourth die station 23. At this location the upset spherical end on the intermediate blank is subjected to lateral deforming pressures while the blank is vertically disposed and the upset portion is flattened to form the finished eye bolt blank. The blank then drops out of the machine along a suitable chute.

FIGURE 2 illustrates the blank as it is progressively formed and the general arrangement of the dies. In the first die station 18 the blank is coned to gather and shorten the length of the material forming the upset portion. A die 26 is mounted in the die breast 10 and is provided with a through bore 27 proportioned to receive the part of the blank 28 which ultimately comprises the shank 29 of the eye bolt. The inner end of the blank engages an ejection pin 31 when it is pressed into the die 26 by a coning tool 32 carried by the reciprocating slide (not shown). The forward end of the die 26 is rounded at 33 to form a smooth transition section.

The coning tool 32 is formed with a forwardly facing coning cavity 34 closed at its inner end by an ejection pin 36. At the completion of the working performed at the first die station 18 the blank 28 is formed with a generally conical upset portion 37 and a shank 29. After the completion of the working of the first die station the blank is ejected by the pin 31 and transferred by grippers to the second die station 19.

At the second die station 19 a second die 39 is mounted in the die breast 10 and is again formed with a through bore 41 adapted to receive the shank 29 of the blank 28. Here again, an ejector pin 42 is provided to engage the inner end of the shank and to eject the blank after the forming operation is completed.

The upsetting tool 43 is provided with a head cavity 44 in which the coned head 37 of the blank 28 is further upset to form the second intermediate blank 45. In this operation the length of the upset portion is reduced and its diameter is increased. After the upsetting tool 43 is carried back clear of the second die station the blank is ejected and the second pair of grippers 13 transfer the blank 45 to the third die station 21. Here again, a die 46 is provided with a through bore 47 adapted to receive the shank of the blank and an ejector pin 48 is positioned to engage the inner end of the shank. The forward portion of the die 46 is formed with a hemispheric die cavity 49 joining the bore 47 with a curved section 51. A tool 52 at the third die station is formed with a hemispheric die cavity 53, so that the intermediate blank 54 formed at the third die station 21 has a cylindrical shank 56 and a spherical upset end 57.

In the first three die stations the blanks are maintained in a horizontally disposed position and the upsetting is produced by endwise pressure applied in the direction of slide movement. After the forming operation at the third die station 21 the blank 54 is ejected by the knockout pin 48 into the third pair of grippers 13 and is transferred to the turning station 22. During this movement the blank 54 remains in the horizontally disposed position.

When it is released by the third pair of grippers at the turning station 22 the head portion 57 engages a pair of spaced support members 58 which are spaced apart a distance less than the diameter of the spherical upset 57, but greater than the diameter of the shank 56. The blank at the turning station 22 is therefore supported by its end at a location spaced from its mass center and is caused to turn by gravity, so that the shank 56 swings down between the support members 58 to a nearly vertical position. Sufficient time is provided for this turning movement of the blank because the blank is free for turning during a period of time substantially equal to the time of one cycle of the machine. A transfer arm 59 is provided at the turning station 22 and is proportioned so that the blank rests against the arm in a substantially vertica position, best illustrated in FIGURE 4.

The transfer arm 59 is operated by a linkage described in detail below at the same time the knockout pins 31, 42 and 48 operates and causes the blank to be pushed to the right as viewed in FIGURES 2 and 4 until it reaches a transfer position illustrated in FIGURE 3. In this position a spherical upset end 57 is pressed against the face 61 of the die breast 10 and the shank 56 is pressed against a stop 62 bolted to the face 61 of the die breast 10.

The stop 62 is proportioned so that it cooperates with the face 61 of the die breast and the transfer arm 59 to hold the blank 54 in the vertical position. The transfer arm 59 is formed with a projecting face 63 and a recessed face 64 which engage the shank 56 and spherical upset 57, respectively.

The support members 58 are inclined upwardly at a slight angle as they extend toward the die breast 10 and terminate at a location 66 spaced from the face 61 by a distance greater than the diameter of the shank 56. This space permits the blank 54 to be transferred horizontally along the die breast face 61 to the die station 23 by the final pair of grippers. Control of the blank is not lost as the blank is pushed into the transfer position because the action of the transfer arm 59 is rapid. However, a chute 60 is provided to carry away any blank if control is lost. This insures that a blank will not jam the machine even if control is lost. The upward incline of the support members 58 raises the blank 54 back to a position wherein the center of the spherical upset 57 is located at the same height as the axis of the dies 26, 39 and 46. The portion of the supports 58 spaced from the die breast 10 is at a lower level so that interference will not occur with the spherical end as it is transferred horizontally from the third die station to the turning station. The inclined arrangement of the supports 58 also assist in maintaining the blank 54 in its position back from the die face 61 as it turns to the generally vertical position.

When the blank 54 is the transfer position of FIG-URE 4 it is properly located for being pushed into the final pair of gripper transfers 13 (best illustrated in FIG-URE 5) for transfer to the fourth die station 23. At the fourth die station 23 a die 67 is provided which is formed with a shallow, generally cylindrical, die cavity 68 in which the spherical portion 57 of the blank 54 is flattened by a tool 69 having a similar shallow, generally cylindrical die cavity 71. In the illustrated embodiment both the die 67 and tool 69 are provided with lower recesses so that the shank 54 is not worked at this station. If desired, however, lateral deforming of the shank can be performed in this die station.

A knockout pin 72 is provided in the die 67 to eject the finished blank from the fourth die station. An ejector pin 73 is also provided in the tool 69 to insure that the blank is not retained in the tool as it is withdrawn from the forward position illustrated. The finished blank then drops through a chute (not shown) out of the machine.

FIGURE 2a is a side elevation of the finished blank 74 formed at the fourth die station. This blank has a shank 76 with a relatively large, generally circular upset portion 77 having flat sides 78 (illustrated in FIGURE 2) and a rounded periphery. The final product is subsequently formed by cutting a lateral passage through the upset portion 77 and threading the shank 76 as required.

Referring now to FIGURE 3, the operation of the transfer arm 59 is provided by a linkage driven by a knockout arm 81 mounted on a cross shaft 82. The upper end of the knockout arm 81 is provided with an adjusting screw 83 which engages a push rod 84 slidably mounted in the machine frame. Springs 86 resiliently urge the push rod 84 to the right, as viewed in FIGURE 3, and maintain the outer end thereof against the adjusting screw 83. The parts are illustrated in FIGURE 3 in the operated position in which the knockout arm 81 has been rotated to the left and has carried the push rod 84 to the left against the action of the springs 86. The push rod 84 is normally provided in a progressive cold former to operate the knockout pins, such as 31, 42, 48 and 72, so this portion of the mechanism is already present in a typical machine.

The push rod 84 is provided with opposed flats 87 which are embraced by a fork portion 88 on the upper end of an operating lever 89. The operating lever 89 is pivoted on the frame of the machine by a pivot pin 91 and is provided with a lower extension connected to a pull rod 92 by a pivot pin 93. The other end of the pull rod 92 is pivoted at 94 to the transfer arm 59 above its pivot 96 on the machine frame.

The spring 86 normally maintains the push rod 84 in a rearward position and the ejector arm 81 is normally in a position spaced in a clockwise direction from the illustrated position. Therefore, the lever 89 is normally in a position spaced in a clockwise direction from the illustrated position and the transfer arm 59 is in its back position, illustrated in FIGURE 4. When the ejector arm 81 moves to the illustrated position it causes the lever 89 to rotate in an anticlockwise direction to the illustrated position and through the pull rod 92 causes clockwise rotation of the transfer arm 59, so that the blank 54 is carried to its transfer position against the face of the die breast. The timing of the machine is such that this occurs immediately before the gripper transfers close to grip the blank and the elements return to their normal position with the transfer arm back from the face of the die breast before the transfer operation is completed. Consequently, the transfer arm 59 is in its back position before the subsequent blank is delivered from the third die station.

Since the operation of the ejector mechanism is timed with the operation of the transfer grippers in a typical progressive former, this simple drive mechanism provides automatic timing of the operation of the transfer arm 59 and it utilizes mechanisms which are normally present in such machines.

Figure 6:
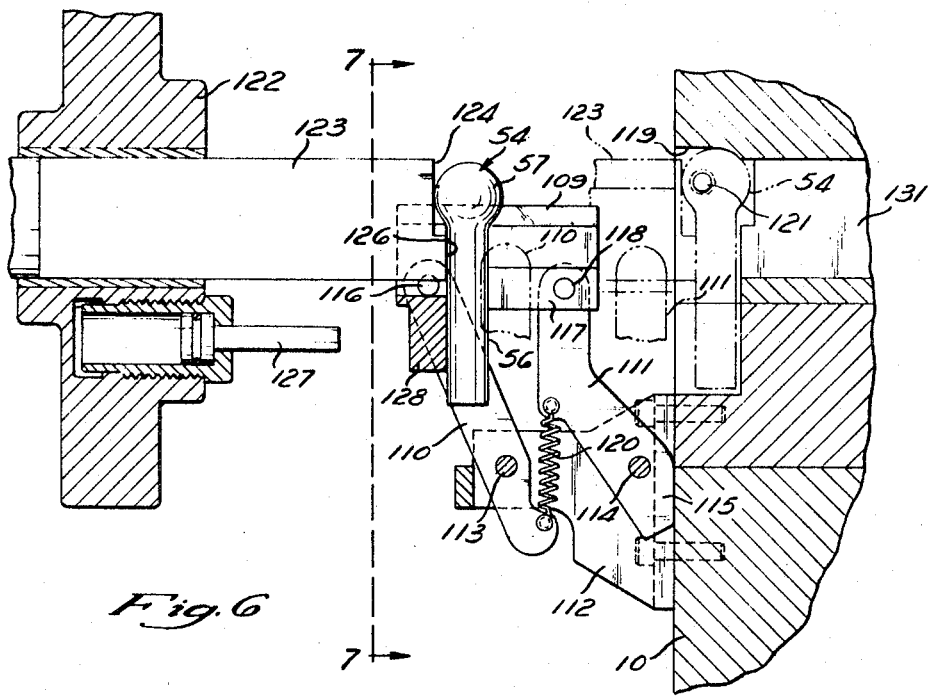
FIGURE 6 is a fragmentary side elevation of a modified turning station mechanism for turning the blank.
Figure 7:
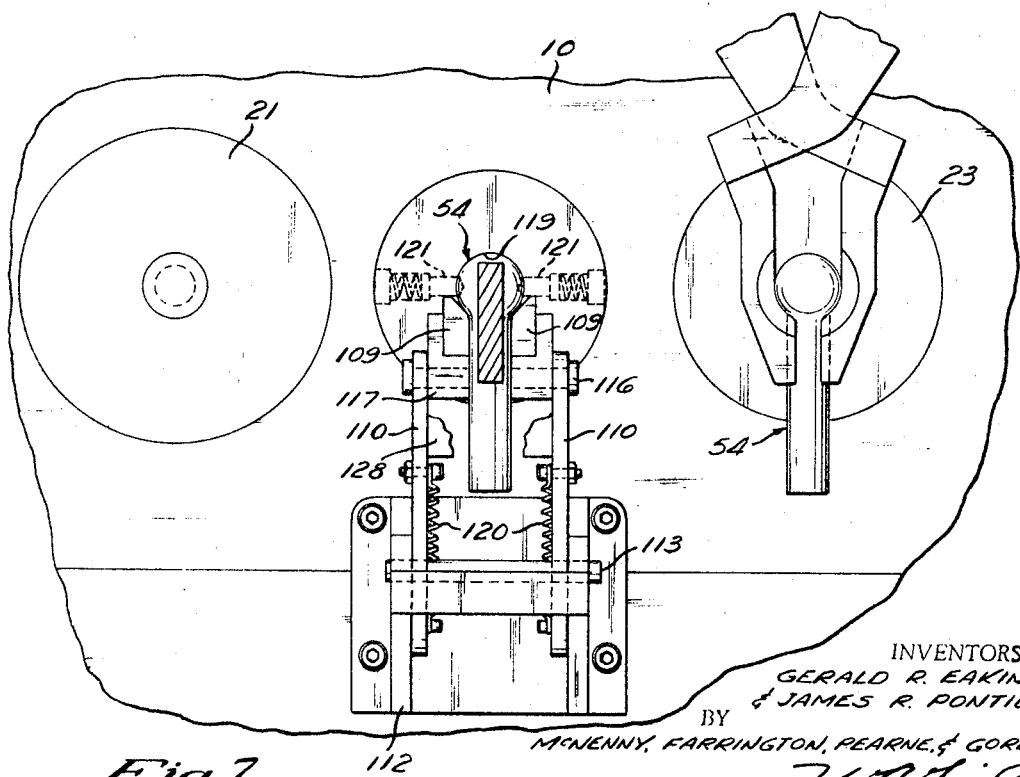
FIGURE 7 is a section taken along 7—7 of FIGURE 6.

FIGURES 6 and 7 illustrate a modified form of turning station. This modified form of turning station is illustrated installed on a machine of the type illustrated in FIGURES 1 and 2 and is arranged for the manufacture of the same eye bolt blank described above. In this modified form, however, the support rails are mounted on a parallelogram linkage so that they may move downwardly and away from the turning station. Consequently, this type of structure is particularly suited for use on machines having transfers which require greater clearance, for example a transfer of the type which swings along an arc as it moves between adjacent die stations. However, the illustrated structure is provided with only the necessary clearance for a lateral transfer of the type illustrated in FIGURE 1.

In this embodiment support rails or members 109 are supported by two pairs of pivot links 110 and 111. The links 110 are pivoted on a frame member 112 for pivotal movement around a pivot axis 113. Similarly, the pivot links 111 are pivoted for rotation relative to the frame 112 about an axis 114. The frame 112 is bolted to the face of the die breast 10. The upper ends of the links 110 are pivoted at 116 to a pivot block 117 which, in turn, supports the support members 109. Similarly, the links 111 are pivoted at 118 on the pivot block 117.

The various pivots are located so that the links cooperate with the pivot block and frame to provide a parallelogram linkage so that the support rails 109 are movable from a rearward position (illustrated in FIGURE 6) spaced back and downward from a forward position against the die breast. Springs 120 are connected between the associated links 110 and 111 to normally maintain the assembly in the rearward position. An extension 115 on the links 111 engages the face of the die breast 10 and limits movement when the linkage is in the rearward position. The die breast is formed with a blank receiving cavity 119 in which the blank 54 is positioned during a portion of the cycle. Spring pressed detents 121 are provided to frictionally retain the blank in the cavity 119.

Mounted on the header slide 122 is a tool 123 proportioned to extend between the rails 109 and provided with offset end faces 124 and 126 adapted to engage the enlarged spherical portion 57 and the shank 56, respectively, of the blank. A pneumatic spring plunger 127 is resiliently biased toward an extended position and is proportioned to engage a projection 128 as the header slide carries the tool and the plunger toward the die breast. The engagement of the plunger 127 with the projection 128 overcomes the action of springs 120 and pushes the support members toward the phantom position of FIGURE 6 wherein the support members are adjacent to the cavity 119. This occurs after the tool 123 engages the blank, but before the blank is pushed off the rails 109. At this point the support rails cannot move further due to engagement with the face of the die breast, so continued forward movement of the header slide causes the plunger to compress relative to the slide and permits the tool 123 to slide the blank along the support rails 109 into the cavity 119.

As the header slide moves back from the forward dead center position the springs 120 operate to return the support rails to their initial position spaced back and downward from the delivery position. The movement of the transfer grippers then occurs to position the grippers in alignment with the blank retained in the die cavity 119 and an ejector 131 operates to eject the blank from the cavity into the transfer. The transfer subsequently transfers the blank to the last work station 23.

This embodiment performs the same function as the first embodiment in that the upset head 57 of the blank 54 is supported by the rails 109 while gravity induces a swinging movement of the shank down between the rails to the vertical position. It should be understood that according to the broader aspects of this invention other means may be used to produce the actual turning of the blank. For example electromagnets or compressed air might be utilized.

A progressive former incorporating this invention is suitable for the manufacture of most elongated blanks requiring turning of the blank between operations so that lateral deforming can be provided by upsetting or deforming pressures applied in the same direction as the initial forming pressures. It should therefore, be understood that a machine incorporating this invention is not limited to the production of eye bolts and that it may be used to form many other types of blanks.

Although preferred embodiments of this invention are illustrated, it is to be understood that various modifications and rearrangements of parts may be resorted to without departing from the scope of the invention.

We claim:

1. A progressive former for elongated blanks comprising a frame, a die breast in said frame providing a plurality of die stations in which a blank is progressively formed, a slide reciprocable in said frame toward and away from said breast, tools on said slide associated with each die station, and transfer means operable to progressively transfer blanks to each die station, said transfer means being operable to turn a blank during transfer between at least two adjacent die stations from a first position to a second position, said blank extending generally parallel to the direction of slide movement when it is in one of said positions and extending in another direction when it is in the other of said positions.

2. A progressive former as set forth in claim 1 wherein said blank extends generally parallel to the direction of slide movement when it is in said first position and substantially normal to the direction of slide movement when it is in said second position.

3. A progressive former as set forth in claim 1 wherein said transfer means includes a turning station substantially midway between said adjacent die stations, and gripper transfer means operable to move blanks to and from said turning station, said turning station including turning means operable to turn a blank between said first and second positions while said blank is at said turning station.

4. A progressive former as set forth in claim 3 wherein said blank extends generally horizontal when in said first position and generally vertical when in said second position, and said turning means operates to support a blank at a location spaced from its mass center while allowing such blank to turn to a generally vertical position under the influence of gravity.

5. A progressive former as set forth in claim 4 wherein said turning means support a blank for a period of time approaching the time of one cycle of slide reciprocation.

6. A progressive former as set forth in claim 4 wherein each blank is upset at one end before being transferred to said turning station, and is supported by its upset end by said turning means.

7. A progressive former as set forth in claim 6 wherein said turning means includes a pair of support members spaced apart by a distance less than the width of said upset and greater than the width of the remaining portions of said blank.

8. A progressive former as set forth in claim 7 wherein said support members are shaped to provide substantially parallel rails extending generally horizontal toward the face of said die breast and terminating at a location spaced from said face of said die breast to provide a free space to permit transfer along said face to a subsequent die station while said blank is in said second position.

9. A progressive former as set forth in claim 8 wherein said support members extend downwardly in a direction away from said face whereby said blank is spaced from said face when the gravity induced turning is completed, and a transfer arm is provided to move the vertically disposed blank along said support members into a position in said space.

10. A progressive former as set forth in claim 9 wherein said former is provided with a knockout means to eject blanks from said die stations, and said transfer arm is connected for operation by said knockout means.

11. A progressive former as set forth in claim 10 wherein said transfer means includes gripper transfers movable along said face and operable to progressively move each blank from each station to the subsequent station.

12. In a progressive former including a plurality of die stations for progressively working an elongated blank, the improvement comprising a transfer mechanism adapted to receive a blank in a generally horizontal position, said transfer mechanism including support means adapted to support a blank at a location spaced from its mass center and allow the blank to turn under the influence of gravity to a substantially vertical position, and means to grip a vertically disposed blank and transfer it to a subsequent die station.

13. A progressive former as set forth in claim 12 wherein said support means include a pair of spaced support members adapted to engage the enlarged head portion of a blank having a reduced diameter shank so that the blank pivots about its end portion to a substantially vertical position, and a pusher operable to push such blank off said support members to a transfer position for transfer to said subsequent die station.

14. A progressive former as set forth in claim 1 wherein a first group of die stations is provided with dies and associated tools operable to apply endwise pressure to progressively upset a portion of said blank before turning said blank to said second position, and a subsequent die station is provided with a die and associated tool operable to apply deforming forces to blanks in said second position with such deforming forces applied in a direction lateral with respect to the length of the blank.

15. A progressive former as set forth in claim 14 wherein said die and associated tool at said subsequent die station applies deforming forces to the upset portion formed in said first group of die stations.

16. A progressive former as set forth in claim 15 wherein said blank is an eye bolt blank, said dies and associated tools of said first group of die stations being shaped to form a spherical upset at one end of the blank, and the die and associated tool of said subsequent die station being shaped to flatten said spherical upset.

17. A method of forming blanks in a single machine comprising positioning of an elongated piece of stock in a predetermined position, subjecting said piece of stock to endwise pressure with a force applied in a predetermined direction parallel to the axis of said stock to form an upset portion which is substantially symmetrical with respect to the central axis of said stock, turning said stock to a second position so that its axis extends laterally with respect to said predetermined direction, and thereafter subjecting said upset portion to deforming pressures applied in said predetermined direction and in a lateral direction with respect to the axis of the stock, thereby flattening said upset portion and increasing its width in a direction normal to the direction of said deforming pressure.

18. A method of forming blanks as set forth in claim 17 wherein said upset portion is spherical, said lateral direction of said deforming pressure is normal to said axis, and the flattened upset portion is generally circular in a plane normal to said direction of said deforming pressure.

19. A method of forming blanks as set forth in claim 18 wherein said upset portion is at one end of said piece of stock, another portion of said stock remains substantially unworked, and said blank is adapted to be made into an eye bolt.

20. A method of forming blanks as set forth in claim 19 wherein said upset portion is formed by progressively deforming said upset portion in a plurality of dies in each of which said stock is subjected to endwise pressure while it is in said one axial position.

21. A method of forming blanks as set forth in claim 17 wherein said piece of stock extends horizontally when it is in said one position and extends vertically when it is in said second position, said upset portion is formed at one end of said piece of stock, and turning between said one position and said second position is produced by gravity while said piece of stock is supported by its upset end.

22. A progressive former as set forth in claim 1 wherein said transfer means includes a turning station; said turning station including a blank receiving cavity adapted to receive and hold a blank in a vertical position, support members adapted to receive a blank in a horizontal position and support such blank at a location spaced from its mass center so that gravity is operable to turn such blank to said vertical position, and pusher means on said slide operable to push the vertically extending blank from said support members into said cavity.

23. A progressive former as set forth in claim 22 wherein said support members are movable between a retracted position spaced from said cavity and a forward position adjacent said cavity, and said pusher means is operable to move said support means to said forward position.

24. A progressive former as set forth in claim 23 wherein said support members move downward and away from said cavity as they move to said retracted position.

25. A progressive former as set forth in claim 24 wherein said support members are mounted on a parallelogram linkage.

References Cited
UNITED STATES PATENTS

| | | | |
|---|---|---|---|
| 228,907 | 6/1880 | Lanz | 10—27 |
| 3,069,917 | 12/1962 | Hilgers | 10—12 |
| 3,247,534 | 4/1966 | McClellan | 10—27 |

CHARLES W. LANHAM, Primary Examiner

G. P. CROSBY, Assistant Examiner

U.S. Cl. X.R.

72—405, 419; 10—12, 27